United States Patent Office 3,576,789
Patented Apr. 27, 1971

3,576,789
FINELY DIVIDED POLY(TRIALLYL ISOCYANURATE) AND POLY(TRIALLYL CYANURATE) BY EMULSION POLYMERIZATION
Rajindar Kochhar and Bert H. Clampitt, Overland Park, and Donald R. Jamieson, Merriam, Kans., assignors to Gulf Research & Development Company, Pittsburgh, Pa.
No Drawing. Filed Oct. 25, 1968, Ser. No. 770,794
Int. Cl. C08g *22/06, 53/18*
U.S. Cl. 260—77.5                                4 Claims

ABSTRACT OF THE DISCLOSURE

Finely divided poly(trially isocyanurate) and poly(triallyl cyanurate) having an average particle size of less than 5 microns are prepared by emulsion polymerization.

BACKGROUND OF THE INVENTION

This invention relates to finely divided poly(triallyl isocyanurate) and poly(triallyl cyanurate) having an average particle size of less than 5 microns, and the method of preparing them by emulsion polymerization.

It has been disclosed in a copending application Ser. No. 721,950, filed Apr. 17, 1968, now U.S. Patent No. 3,539,665, that a dyeable, lusterless polyolefin, such as polypropylene, can be produced by blending a major portion of polyolefin, such as polypropylene, with a minor portion of a polymer or a copolymer of finely divided triallyl isocyanurate or triallyl cyanurate. The finely divided additive polymer is preferably dry mixed with polyolefin, such as polypropylene, and blended at temperatures above the melting point of the polyolefin, with conventional thermoplastic material blending apparatus.

In order to produce an acceptable final dyed polyolefin material, the polymer or copolymer of triallyl isocyanurate or triallyl cyanurate must be very finely divided. If not finely divided, the additive shows up conspicuously in the dyed material as tiny flecks of more heavily dyed areas.

Bulk polymerization of triallyl isocyanurate and triallyl cyanurate are known in the prior art. For example see U.S. 3,037,979 to Fukui, at column 5, line 20.

SUMMARY

It has been found that a new article of manufacture, a finely divided thermoset polymer of poly(triallyl isocyanurate) and/or poly(triallyl cyanurate), having an average particle size of less than 5 microns, and preferably less than 1 micron can be prepared by emulsion polymerization. This finely divided polymer can be blended as a minor portion with polyolefins such as polypropylene to produce a dyeable lusterless product, as disclosed in copending application 721,950 filed Apr. 17, 1968, hereby incorporated by reference.

PREFERRED EMBODIMENTS

The following examples demonstrate how the finely divided thermoset polymer of this invention is prepared. By these methods, the finely divided polymer can be prepared to have an average particle size of less than 5 microns, and preferably less than 1 micron. In the following paragraphs triallyl cyanurate is abbreviated TAC and triallyl isocyanurate is abbreviated TAIC.

Example 1

The following recipe was found to give good yields of the polymer:

TAIC—265 g.
Water—1 l.
Triton N-101—30 g.
Potassium persulfate, $K_2S_2O_8$—1.5 g.

(1) TAIC was dispersed slowly with stirring in an aqueous solution of Triton N-101 contained in a 3 liter round-bottom flask fitted with a mechanical stirrer and a reflux condenser.

(2) The contents of the flask were heated to 50° C. and potassium persulfate in 15 ml. water was added, followed after about 25 minutes by a solution consisting of

```
                                                       G.
NaHSO₄ ----------------------------------------- 2
Na₂HPO₄ ---------------------------------------- 2
``` in 15 ml. of water.

(3) The temperature of the flask was then raised to 70–75° C. and held for one hour.

(4) The flask was stored overnight without stirring at 50° C.

(5) The precipitated polymer was filtered, washed successively with water and methanol and dried in air.
Yield was 52.5%.

(6) The polymer did not melt or degrade when heated to a temperature of 300° C.

(7) The polymer had an average particle size of less than 0.22 micron.

Example 2

The same procedure as Example 1 was used to prepare a polymer from the following recipe:

TAIC—50 g.
Water—250 ml.
Triton N-101—6 g.
Potassium persulfate, $K_2S_2O_8$—0.5 g.

The yield was 51.3%.

Example 3

The procedure of Example 1 was followed using the recipe of Example 2 with the exception that TAC was substituted for TAIC.

INITIATOR

In this process, free radical initiators, preferably persulfate types such as potassium persulfate and ammonium persulfate, are used. However, the method is not restricted to persulfates. Persulfates are employed because they decompose in the temperature range of 70 to 80° C. to generate free radicals. Water is the preferred suspension medium; thus the suspension medium remains stable during polymerization, i.e., does not boil or bubble or break down the liquid phase. Other free radical type catalysts decomposing below or above 70 to 80° C. could also be used, for example, by cooling the reaction mixture before starting the reaction when using free radical compounds that decompose below 60° C., and carrying out the reaction under pressure for those free radical type initiators which decompose above 100° C.

A buffer mixture such as sodium bisulphate and disodium orthophosphate is sometimes a useful aid to this reaction.

EMULSIFIER

A nonionic type of emulsifier is used in this invention, although other types can be used. The preferred nonionic type emulsifier is a polyethoxylated alkyl phenol, and particularly an alkyl phenoxy polyethoxy ethanol such as Triton N-101 (Rohm & Haas).

TEMPERATURE AND TIME

The temperature of the reaction is determined by the type of initiator used as discussed above. The reaction begins immediately after the contents are raised to the temperature of decomposition of the initiator. At higher temperatures the rate of decomposition can be so rapid that much of the initiator is not utilized. At low temperatures, the rate of decomposition is so slow that the reaction takes a long time. Therefore, in actual practice the polymerization mixture is heated to start the reaction and then stored until it cools. For example, using a persulfate initiator the dispersion containing initiator is heated to a temperature of about 50° to 100° C. to decompose the initiator and then the monomer is allowed to polymerize at a temperature of about 50 to 75° C. for a period of about 2 minutes to about 48 hours. Preferably, the dispersion containing persulfate initiator is heated to a temperature of about 70 to 75° C. for about 1 hour, then stored for about 12 to 18 hours without stirring at a temperature of about 50° to 60° C.

We claim:

1. An article of manufacture consisting of a finely divided thermoset polymer selected from the group consisting of a homopolymer of triallyl isocyanurate, a homopolymer of triallyl cyanurate, and a copolymer of monomers consisting solely of triallyl isocyanurate and triallyl cyanurate, said finely divided polymer having an average particle size of less than 5 microns, and said finely divided polymer prepared by dispersing a monomer selected from the group consisting of triallyl isocyanurate, triallyl cyanurate or a monomer mixture consisting solely of triallyl isocyanurate and triallyl cyanurate in an aqueous suspension medium by mixing said monomer or monomer mixture with an emulsifier in said medium, heating said dispersion, adding an initiator to said dispersion, further heating said dispersion, allowing said monomer to polymerize while dispersed in said medium to form finely divided polymer particles which precipitate on standing, filtering said polymer particles, washing said polymer particles with water and methanol, successively, and drying said polymer particles.

2. The article of claim 1 wherein the finely divided polymer has an average particle size of less than 1 micron.

3. A method of preparing a finely divided thermoset polymer having an average particle size of less than 5 microns and selected from the group consisting of a homopolymer of triallyl isocyanurate, a homopolymer of triallyl cyanurate, and a copolymer of monomers consisting solely of triallyl isocyanurate and triallyl cyanurate, comprising
   (a) dispersing a monomer selected from the group consisting of triallyl isocyanurate, triallyl cyanurate or a monomer mixture consisting solely of triallyl isocyanurate and triallyl cyanurate in an aqueous suspension medium by mixing said monomer or monomer mixture with an emulsifier in said medium,
   (b) heating said dispersion,
   (c) adding an initiator to said dispersion,
   (d) further heating said dispersion,
   (e) allowing said monomer to polymerize while dispersed in said medium to form finely divided polymer particles which precipitate on standing,
   (f) filtering said polymer particles,
   (g) washing said polymer particles with water and methanol, successively, and
   (h) drying said polymer particles.

4. The method of claim 3 wherein the finely divided polymer has an average particle size of less than 1 micron.

References Cited

UNITED STATES PATENTS

| | | | |
|---|---|---|---|
| 3,003,845 | 10/1961 | Ehlers | 260—77.5 |
| 3,242,140 | 3/1966 | Hoover | 260—77.5 |

OTHER REFERENCES

Kirk-Othmer: Encyclopedia of Chemical Technology, vol. 18, Interscience, New York (1969), pp. 324, 339–340, 359–360, 365.

DONALD E. CZAJA, Primary Examiner

H. S. COCKERAM, Assistant Examiner

U.S. Cl. X.R.

8—100, 162B; 260—29.6HN, 29.7PT, 29.7R, 77.5AX, 859